United States Patent
Kao et al.

(10) Patent No.: US 6,506,703 B1
(45) Date of Patent: Jan. 14, 2003

(54) METHOD FOR DEPOSITING CATALYST METALS INTO ZEOLITE TO PRODUCE HYDROCARBON PROCESSING CATALYST

(75) Inventors: Jar-Lin Kao, Houston, TX (US); Kenneth Ray Clem, Humble, TX (US); Thomas Henry Vanderspurt, Stockton, NJ (US); Shun Chong Fung, Bridgewater, NJ (US)

(73) Assignee: Exxon Mobil Chemical Patents Inc., Houston, TX (US)

( * ) Notice: Subject to any disclaimer, the term of this patent is extended or adjusted under 35 U.S.C. 154(b) by 0 days.

(21) Appl. No.: 09/341,717

(22) PCT Filed: Jan. 16, 1998

(86) PCT No.: PCT/US98/00829

§ 371 (c)(1),
(2), (4) Date: Jan. 24, 2000

(87) PCT Pub. No.: WO98/31462

PCT Pub. Date: Jul. 23, 1998

Related U.S. Application Data

(60) Provisional application No. 60/035,531, filed on Jan. 16, 1997.

(51) Int. Cl.$^7$ ............................ B01J 29/62; B01J 29/068
(52) U.S. Cl. ............................. 502/66; 502/64; 502/74; 502/79
(58) Field of Search .................................. 208/135, 137, 208/138, 141; 585/407; 502/64, 66, 74, 79, 60

(56) References Cited

U.S. PATENT DOCUMENTS

| | | | |
|---|---|---|---|
| 3,216,789 A | 11/1965 | Breck et al. .................. | 23/113 |
| 3,917,543 A | 11/1975 | Bolton et al. ................ | 252/455 |
| 4,544,539 A | 10/1985 | Wortel ......................... | 423/328 |
| 4,552,856 A | 11/1985 | Tauster et al. ................ | 502/74 |
| 4,568,656 A * | 2/1986 | Poeppelmeier et al. ....... | 502/74 |
| 4,717,700 A | 1/1988 | Venkatram et al. ........... | 502/85 |
| 4,824,816 A | 4/1989 | Trowbridge et al. .......... | 502/66 |
| 4,839,320 A * | 6/1989 | Trowbridge et al. .......... | 502/66 |
| 5,066,628 A | 11/1991 | Miller et al. .................. | 502/66 |
| 5,348,924 A | 9/1994 | Potter et al. .................. | 502/66 |
| 5,491,119 A | 2/1996 | Verduijn ....................... | 502/74 |

FOREIGN PATENT DOCUMENTS

| | | | |
|---|---|---|---|
| EP | 0323136 | 7/1989 | ............ B01J/29/32 |

* cited by examiner

*Primary Examiner*—Stanley S. Silverman
*Assistant Examiner*—Christina Ildebrando

(57) ABSTRACT

An ion exchange method is provided for loading and uniformly distributing noble metals into a catalyst substrate comprising a zeolite to make a monofunctional, non-acidic reforming catalyst. The catalyst substrate is contacted with an aqueous loading solution comprising noble metal cations and non-noble metal cations. The loading solution is formulated such that the equivalents of non-noble metal cations remaining in the catalyst not ionically bonded to the zeolite when loading is complete is 1.2 to 6.0 times the equivalents of non-noble metal cations displaced from the zeolite when the noble metal cations ion exchange into the zeolite, and simultaneously the endpoint pH of the loading solution is between 10.0 and 11.5. The required 1.2 to 6.0 ratio is achieved when the ratio of moles of non-noble metal cations added to the loading solution to moles of noble metal added to the loading solution is between 1 and 10. The use of ion exchange method results in zeolite catalysts having reduced amounts of detrital material in the micropores of the zeolite.

28 Claims, No Drawings

METHOD FOR DEPOSITING CATALYST METALS INTO ZEOLITE TO PRODUCE HYDROCARBON PROCESSING CATALYST

This application claims the benefit of Provisional application Ser. No. 60/035,531, filed Jan. 16, 1997.

FIELD OF THE INVENTION

The present invention relates to depositing catalyst metals into zeolite substrates to produce non-acidic, zeolite based hydrocarbon processing catalysts. More particularly, the present invention is directed to a method for loading and uniformly distributing Group VIII catalyst metals into large/medium pore zeolites via ion exchange with exchangeable cations in the zeolite to make non-acidic hydrocarbon processing catalyst. Specifically, this invention is a method for loading platinum into zeolite L, X, Y, and ZSM-5 catalysts to make non-acidic monofunctional reforming catalysts.

BACKGROUND OF THE INVENTION

Reforming is a major petroleum refining process used to raise the octane rating of naphtha streams, for blending into motor gasoline and to produce light aromatics from paraffins and naphthenes in naphtha which are then extracted and used to make chemical Intermediate products.

Reforming reactions include dehydrogenation, isomerization and dehydrocyclization, i.e., aromatization. Reforming catalysts are particularly effective in aromatizing naphthenes paraffins.

Reforming catalysts also crack paraffins to light hydrocarbons and methane. However, cracking is undesirable since it produces fuel gas which has less valued than paraffins. Cracking liquids to gases is undesirable since gas fuels are worth less than liquid fuels. Catalysts with more propensity to aromatize and less propensity to crack are said to have high selectivity.

Reforming catalysts deactivate progressively during normal operation due to deposition of coke on the catalyst and agglomeration of the noble catalytic metals dispersed in the catalyst. Periodically, the catalyst is regenerated to recover activity by burning off the accumulated coke and redispersing the catalytic metals.

Currently, the most widely used commercial reforming catalysts are comprised of a Group VIII metal, such as platinum, or platinum plus a second catalytic metal typically rhenium or iridium, dispersed on alumina. These catalysts are bifunctional, i.e., they have two types of catalyst sites: metal sites and strong acid sites.

The catalytic metal sites are one or more Group VIII metal, such as platinum. Additional metals, such as rhenium or iridium are dispersed on the alumina to enhance or modify the activity of the catalytic metal. The acid sites are typically a halogen such as chlorine which is adsorbed on to the alumina substrate. The dehydrogenation and dehydrocyclization reactions occur on the metal sites and the isomerization reactions occur on the acid sites. The undesirable reactions, cracking and coking, also occur on the acid sites.

Bifunctional catalysts aromatize $C_8$ paraffins very well but they do not aromatize $C_6$ paraffins to benzene and $C_7$ paraffins to toluene well. A new class of reforming catalysts has been developed which aromatizes $C_6$ and $C_7$ paraffins to aromatics with great facility, significantly better than bifunctional catalysts.

These new catalysts employ zeolites, highly structured crystalline alumina/silica materials, as the substrate for the catalyst noble metal rather than alumina, which is amorphous. These new zeolite catalysts are monofunctional as they contain few acid sites and both the dehydrocyclization and isomerization reactions are catalyzed on the noble metal sites.

Unwanted acidity is introduced into the catalyst when the catalytic metals are reduced to activate the catalyst. Acidity impairs catalyst performance and accelerates deactivation. Catalyst performance is further impaired by detrital material which is deposited in the micropores of the zeolites when it is formed into aggregates. Current loading processes deposit additional detrital matter in the catalyst.

U.S. Pat. No. 4,568,656 describes. an immersion process for loading platinum onto a Zeolite-L wherein a nonplatinum metal salt is added to the platinum containing loading solution in an amount (A) such that following the exchange of platinum from the loading solution into the Zeolite-L to cause a release of nonplatinum metal from the Zeolite-L back into the loading solution in an amount (A'), that the following conditions apply, $$\frac{A + A'}{Z} = \frac{0.3A'}{X} \text{ to } \frac{1.2A'}{X}$$

wherein X is the amount of loading solution to fill the total pore volume of the Zeolite-L to incipient wetness and Z is the amount of loading solution used for the total immersion of the Zeolite-L. The loading process is said to reduce the number of acid sites formed in the catalyst when it undergoes activation by reduction of its platinum content.

SUMMARY OF INVENTION

The present invention is directed to methods for loading catalytic metals into zeolites.

The metal loading process of the present invention removes detrital matter. Moreover, the present process precludes or minimizes deposition of detrital matter during metal loading.

The present invention is particularly useful for loading Group VII noble metals into large pore zeolites or medium pore zeolites to make a hydrocarbon processing catalyst. Most particularly, this invention is useful for depositing platinum into zeolite L, X, Y, or ZSM-5 to make a monofunctional (non-acidic) catalyst which is effective for reforming light naphtha hydrocarbons into aromatics.

In one embodiment, the present invention is an ion exchange process for dispersing or loading catalytically active noble metals into zeolites to make hydrocarbon processing catalysts.

More specifically, the present invention is directed to an ion exchange method for loading catalyst metals into zeolites which involves maintaining a predetermined amount of non-catalytic metal exchangeable cations in the loading solution while simultaneously controlling the end point pH within a specified range.

The ion exchange method for loading catalytic metals into zeolite catalyst in accordance with the present invention results in catalyst that exhibits higher activity and selectivity than can be achieved with alternative loading procedures.

One problem with current loading processes is that they introduce unwanted acidity into the catalyst. Acidity reduces the yield and selectivity of the catalyst to desired products by promoting cracking of the feed, and accelerating deactivation by inducing coke formation on the surfaces of the catalyst.

The unwanted acidity is induced after the catalyst is charged to the process reactor during reduction of the catalyst prior to introducing the hydrocarbon feed to initiate reaction. During catalyst reduction, the noble metal cations which were ion exchanged into the zeolite during metal loading are reduced to their zero valent state by contact with hydrogen. The noble metals vacate the ion exchange sites in the zeolite which they had occupied as cations. To maintain electrical charge balance the zeolite captures hydrogen ions which are present in the background and these hydrogen ions are the undesirable acid sites. A preferred process for activating zeolite based catalysts is described in U.S. Pat. No. 4,717,700.

In the present invention, unwanted acidity in the catalyst is avoided by formulating the loading solution so that non-noble metal cations are added to the catalyst in addition to the noble metals. The non-noble metal cations are added as a salt admixed into the catalyst. When the noble metal cations are reduced, these excess non-noble metal cations dissociate from their salt and occupy the zeolite ion exchange sites vacated by the noble metals. Thus, unwanted acidity in the catalyst is precluded or minimized. A reasonable excess of non-noble metal cations over the amount of ion exchange sites is required to ensure exclusion of hydrogen ions. However, too large an excess of non-noble metal cation salt is to be avoided because salts clog the zeolite passages and interfere with diffusion of reactants and products to and from the active catalytic sites thus impairing catalytic activity.

Another problem with current loading procedures is that they do not remove detrital material, e.g., amorphous alumina and silica, in the catalyst deposited when the zeolite was formed into aggregates. Moreover, additional detritus is deposited during metal loading. Detrital matter deposits interfere with flow of reactants and products in the zeolite channels to and from active catalytic sites. A key aspect of the metal loading procedure of the present invention is that it has been unexpectedly discovered that a narrow pH range within which to operate such that deposition of detritus does not occur and detritus deposited during forming is removed.

Accordingly, the present invention is directed to admixing a specified amount of non-noble metal cations into the catalyst when the catalyst is separated from the loading solution; and controlling the pH of the loading solution in a specified range when the loading procedure is terminated.

It has been determined that the amount of non-noble metal cations admixed into the catalyst for purposes of the present invention should be between about 1.0 and 6.0 times the equivalents of non-noble metal cations released from the zeolite when the noble metal cations ion are exchanged into the zeolite. Preferably, this ratio should be between about 2 and 4. It has also been determined that the pH of the loading solution at completion of metal loading should be between about 10.0 and 11.5. In this range, the loading solution has optimal capability to dissolve and suspend amorphous metal oxide detritus without attacking the crystal structure of the zeolite.

It has been further observed that although the optimal loading solution pH endpoint for zeolite aggregates is in the 10.0 to 11.5 range, zeolite aggregates differ from each other enough that catalyst performance can be further optimized by determining within the broad 10.0 to 11.5 pH range, a 0.2 pH range best suited for the particular catalyst. This narrower pH range varies from catalyst to catalyst. Although the optimum endpoint pH for a batch of zeolite catalyst will be in the 10.0 to 11.5 range, the preferred optimum endpoint pH may for example, be 10.9 to 11.1 pH or 10.1 to 10.3 pH. Within the overall 10.0 to 11.5 range, the exact optimal pH must be determined by trial and error experiment for each catalyst by observing the effect of pH on catalyst performance.

The residual non-noble metal cations may all be the same cation as the original zeolite cation. For example, with the potassium form of zeolite L, the original cation is potassium. Accordingly, all additional cations added to the loading solution to make up the required non-noble metal cation concentration may be potassium cations.

Alternatively, other appropriate cations can be used as part of the non-noble metal cation complement in the loading solution. For zeolite L, appropriate cations other than potassium include Group IA (sodium, rubidium, and cesium) and Group IIA (magnesium, calcium, strontium, and barium) metals of the Periodic Table. Of course, some of the original cations in the zeolite are always present in the loading solution because they are released into the loading solution when the noble metal cations ion exchange into the zeolite. Therefore, even if cations other than the original zeolite cation are used in the loading solution, some original zeolite cations displaced when the noble metal cations ion exchange into the zeolite and the original zeolite cations will be part of the residual cations left in the catalyst.

An important aspect of the present invention is that a predetermined concentration of cations, other than catalytic metal cations, is maintained in the loading solution bath so that, when the zeolite catalyst is removed from the loading solution bath, a specified amount of non-catalytic metal, also referred to herein as non-noble metal cations, cations remain dissolved in the loading liquor and trapped in the zeolite pores. Subsequently, when the catalytic metal is reduced to the zero valent state to activate the catalyst and the catalytic metal cations vacate the ion exchange sites, the non-catalytic metal cations occupy the vacant ion exchange sites in preference to hydrogen ions so that electrical neutrality is established in the zeolite. This is important so as to preclude hydrogen ions from occupying the ion exchange sites in the zeolite because the hydrogen ions are undesirable acidic sites which induce coking and feed cracking during reforming operation.

The amount of non-noble metal cations left in the zeolite is controlled in accordance with the present invention to within the desired range by adjusting the concentration of non-noble metal salts in the loading solution. The amount of non-noble metal cations left in the catalyst is simply the concentration of non-noble metal cations in the loading solution times the amount of loading solution left in the catalyst when loading is finished. With the impregnation loading procedure the amount of loading solution left in the catalyst is the total amount of loading solution added to the catalyst since all of the loading solution is absorbed into the catalyst. With the immersion procedure, the amount of loading solution held by the catalyst is its saturation liquid holding capacity. This liquid holding capacity is different for each catalyst and must be experimentally measured.

It has been determined as a general rule that the amount of residual non-noble metal cation left in the catalyst after loading will always be in the desired range, if the moles of potassium cations added to the loading solution is between about 1 and 10 times the moles of noble metal preferably 4 to 8, most preferably 5 to 7.

Alternatively, a salt of barium, strontium, calcium, rubidium, cesium or other suitable cation or mixture of cations may be charged to the loading solution to make up the requisite concentration of cations. The original zeolite cations always make up at least part of the non-catalytic cation residue charge because the catalytic metal cations displace zeolite cations when they ion exchange into the catalyst and these displaced cations diffuse into the loading solution.

As used herein, the term "non-catalytic metal exchangeable cations" is meant to include cations which are the same as the exchangeable cations of the zeolite cations as well as exchangeable cations which are different from the exchangeable cations of the zeolite which may be included in the loading solutions. The "noncatalytic metal exchangeable cations" which are different from the exchangeable cations of the zeolite are referred to as "other cations".

In accordance with this invention, it is also required to control the final pH of the loading solution. This is accomplished by adding some of the required non-noble metal cations as a salt such as the nitrate or chloride of the cation and some as the hydroxide base and adjusting the ratio of salt to base to attain the target endpoint pH range. The more base and less salt, the higher the endpoint pH. The relationship between the salt to base ratio to achieve the desired endpoint pH is different for different catalysts and must be determined by experiment.

With the total immersion process, endpoint pH of the loading solution can be measured directly because there is free loading solution in contact with the catalyst when loading is complete. With impregnation, also referred to as the "pore filling" method, direct measurement of endpoint pH is not possible so an indirect method is required. One indirect method is to determine the pH of the supernatant liquid formed when one gram of platinum loaded catalyst is mixed with ten grams of water. The pH range of the supernatant liquid must be between 10.0 and 11.5 in accordance with this invention. Another indirect procedure is to measure the pH of the liquid which appears when loading solution is added to a sample of the catalyst until incipient wetness is exceeded. Again, in accordance with this invention, the pH of this liquid must be between 10.0 and 11.5.

This aspect of the invention is used in conjunction with controlling the zeolite cation concentration in the loading solution so as to leave a proper amount of non-catalytic metal exchangeable cations in the catalyst when it is removed from the loading solution.

For purposes of the present invention, therefore, both the number of zeolite and other non-catalytic metal cations left in the catalyst and the loading solution endpoint pH can be controlled within limits specified to make a catalyst with optimal activity and stability.

The present invention is also directed to catalysts produced in accordance with the process of the present invention including catalysts comprising a zeolite wherein the zeolite comprises catalyst metal cations in zeolite cation sites and non-catalytic metal exchangeable cations not in zeolite cation sites present in a molar ratio of between about 1:2.4 to about 1:6.0 when the charge ratio of the former to the latter is 2:1. When the charge ratio of the former to the latter is 1:1, the molar ratio is between 1:1.2 to 1:3.0.

DETAILED DESCRIPTION

Zeolites are crystalline microporous molecular sieves which are constructed of tetrahedral unit cells arranged in a repetitive pattern to form microchannels large enough to pass molecules. The unit cells can be comprised of alumina and silica. Large/medium pore zeolites, i.e., those with 5 to 15 Angstrom pore diameters, which include zeolite X, zeolite Y, ZSM-5 and zeolite L, are preferred substrates for monofunctional reforming catalysts which are useful for aromatizing paraffins to light aromatics. Zeolite L is most preferred.

Negative charges are induced when alumina and silica units combine in a zeolite crystal structure. Accordingly, zeolites must contain cations in their crystal structure to neutralize the negative charges. Many of these cations are accessible for exchange with other cations. Zeolite L is usually crystallized using potassium as the charge neutralizing cation. Most of the potassium cations can be replaced by other cations using conventional ion exchange procedures. Barium, calcium, strontium, rubidium and cesium have been reported to be suitable ion exchange replacements for potassium cations for zeolite L catalyst supports.

A form of zeolite L preferred for monofunctional reforming catalysts is described in U.S. Pat. Nos. 4,544,537, 4,544,539 and 4,452,856. U.S. Pat. Nos. 4,824,816 and 4,839,320 disclose another preferred form of zeolite L made by washing zeolite L after recovery from its crystallization mother liquor with an aqueous media to achieve a specific pH. These patents are hereby incorporated by reference.

Zeolite L precipitates as small crystals, typically 0.1 to 2 micron size, or powder. The zeolite crystal powder is formed into aggregates such as tablets, spheres, or extrudates. This may be accomplished by combining an inert inorganic material, such as a clay, silica, or alumina with the zeolite to bind the aggregate. The aggregates must have sufficient crush strength and attrition resistance to withstand the mechanical stresses in commercial reactors, and the zeolite must retain its catalyst activity and regenerability in the bound aggregate.

The zeolite substrate is converted to a catalyst by dispersing noble metals into the zeolite. The noble metal clusters in the zeolite are the catalytic sites upon which the chemical reactions occur. Group VIII noble metals which includes platinum, palladium, rhodium, iridium, ruthenium, and osmium singly or in combinations are commonly used. Platinum is most preferred for reforming catalysts. Rhenium or tin may be added to promote the catalytic activity of the Group VIII noble metal. Typically, the amount of noble metal in the catalyst will range between 0.1 and 6.0% by weight on catalyst. (The metals have been identified and are grouped in accordance with the Periodic Table in the Handbook of Chem. & Physics published by the Chemical Rubber Company, 48th edition).

Catalyst metals, typically a Group VIII metal, such as platinum, are added to the zeolite to impart catalyst activity. There are two methods for loading catalyst metals into zeolite: impregnation and ion exchange.

Impregnation metal loading involves dripping a limited amount of water solution of a salt of the catalyst metal into the zeolite such that all the solution is totally absorbed and there is no excess aqueous solution, i.e., all the catalyst metal in the solution ends up in the zeolite. The zeolite is vigorously tumbled while adding the loading solution to uniformly distribute platinum.

Total immersion involves contacting a batch of zeolite with sufficient excess of aqueous loading solution so that there is free loading solution in contact with the catalyst after the zeolite aggregate is saturated. With the immersion process typically only 90% to 95% of the noble metal in the loading solution ion exchanges into the catalyst and 5 to 10% of the noble metal remains in the loading solution when the catalyst is removed. Since noble metals are expensive, the residual noble metal left in the loading solution is not discarded but is either recovered or the loading solution is recycled.

Zeolites contain zeolite cations to neutralize ionic electronegativity inherent in zeolite crystals. These zeolite cations are exchangeable with other cations. The catalyst metal cations present in the loading solution as cations, or contained in cationic coordinated complex ions, ion exchange into the zeolite to replace zeolite cations.

In order for the noble metal to ionically bond into the zeolite by ion exchange, the noble metal must be added in its cationic (positively charged) form or as part of a cationic coordinated complex. In the cationic form, the noble metal cations replace or ion exchange with the cations in the ion exchange sites in the zeolite. The noble metal cations ionically bond with the zeolite by displacing the exchangeable zeolite cations. The noble metal cations must be in cationic form because cations can ion exchange with zeolite cations but anions cannot. This invention is limited to ion exchange processes which means that the noble metal must be in cationic (positive) form not anionic (negative) form.

The ion exchange method of the present invention involves contacting a catalyst substrate containing zeolite wherein the zeolite comprising exchangeable zeolite cations, with an aqueous loading liquor while simultaneously controlling the endpoint pH of the loading solution in the range of about 10.0 to 11.5. The loading bath also contains predetermined amounts of catalytic metal cations and other cations. The amount of catalytic metal cations added to the bath depends on the catalyst loading desired in the finished catalyst, e.g., the percent by weight of catalytic metal on total catalyst that is required. Catalytic metal loadings typically range from 0.05 to 6.0 wt % on catalyst. Not all the catalytic metal charged ends up in the catalyst; typically only about 95% of the catalytic metal added to the loading solution ends up in the catalyst. Therefore, excess catalytic metal must be charged to the loading solution.

The total immersion ion exchange metal loading method involves contacting the zeolite substrate with sufficient aqueous loading solution for free liquid to remain after the catalyst is saturated. The loading solution contains noble metal in cationic form, as cations or contained in cation complexes. Sufficient noble metal is added to the loading solution to achieve the desired weight percent of noble metal on catalyst taking into account that not all the noble metal in the loading solution ion exchanges into the zeolite, some remains in the loading solution.

The concentration of non-noble metal cations in the loading solution is fixed so that the number of non-catalytic cations left in the catalyst when the catalyst is withdrawn from the bath is about 1.2 to 6.0 times the number of zeolite cations displaced by catalytic metal cations when they ion exchanged into the catalyst. In general, the desired ratio is achieved by maintaining the ratio of non-noble metal cations to noble metal cations added to the loading solution in the range of 1 to 10, preferably 4 to 7, most preferably 5 to 6. In addition, the ratio of non-noble metal cations added to the loading as the hydroxide base to non-noble metal cations added to the loading solution as a salt is adjusted to obtain an endpoint loading solution pH of between 10.0 and 11.5.

The loading solution contains non-noble metal cations released into the loading solution when the noble metal cations ion exchange into the zeolite. Additional non-noble metal cation must be added to the loading solution to make up the required concentration of non-noble metal cations. The additional non-noble metal cations added to the loading solution can be the same cation as the original zeolite cation or other cations. The original zeolite cation in zeolite L is usually potassium. The other cations can all be potassium or can include other cations. There are always potassium ions in the loading solution since potassium ions were displaced by catalytic metal cations and diffused into the loading solution. Therefore, some of the non-noble metal cations must be potassium. The difference between the required amount of non-catalytic cations and displaced potassium cations can be cations other than potassium. For zeolite L, one or more cations from the group barium, calcium, sodium, strontium, rubidium, and cesium are typically suitable. If potassium is the non-noble metal cation, the base is potassium hydroxide and the salt can be any suitable salt such as potassium chloride or potassium nitrate. Salts containing sulfur are not suitable since sulfur is a poison to the catalyst. The ratio of the base to salt is adjusted so that the endpoint pH of the loading solution is between 10.0 and 11.5. Also, the concentration of potassium in the loading solution is adjusted to make the equivalents of potassium remaining in the catalyst not ionically bonded into the zeolite between 1.2 to 6.0 times the equivalents of potassium ions displaced by the noble metal cations when they ion exchanged into the zeolite. In general, the ratio of the moles of platinum added to the loading solution to moles of non-noble metal cations added to the loading solution should be between one and ten, preferably, between four and eight and most preferably between five and seven to achieve the desired concentration of excess non-noble metal cations in the finished catalyst.

In addition, it is important that the endpoint pH of loading solution be in the range of about 10.0 to about 11.5. This is accomplished by adding part of the non-catalytic cation as a neutral salt and part as an hydroxide (base). The ratio of salt to base to achieve the target end point pH is determined by experimenting for each system and formulation because it is not predictable or calculable.

Each zeolite (e.g., zeolite X, Y, L, ZSM-5, etc.) and each zeolite aggregate as a tablet, sphere or extrudate form will, for a particular kind of binder (i.e., clay, silica, alumina, etc.) and binder amount used for formulating the zeolite into aggregate form, and for any particular level of noble metal loading (i.e., 0.05 to 6.0 wt % on catalyst), have a different end point pH in the range of 10.0 to 11.5 at which the particular catalyst functions to give its optimum yield and selectivity values for a given reforming condition. This may be seen by reference to Example 2 hereof wherein a zeolite L extrudate bound with 28 wt % alumina binder was formulated into five slightly different versions (catalyst A–E) of a catalyst each to a 0.64 wt % platinum loading. The most optimum catalyst was catalyst D the loading end point pH of which was pH=10.9.

Accordingly, it is an aspect of this invention to formulate the catalyst to its most optimum performance level by determining that molar ratio of non-noble metal salt to non-noble metal base (i.e., KCl/KOH) which will supply the requisite amount of non-noble metal cation to the loading solution and which will also, after completion of the loading operation, yield for the supernate loading solution an end point no more than ±0.1 pH units off that end point pH valve in the range of 10.0 to 11.5 at which the final catalyst gives its optimum yield and/or selectivity performance.

This may be determined without undue experimentation by a routine of screening in the laboratory for any given zeolite aggregate of a particular set of characteristics (zeolite type, binder type and amount for forming the zeolite to an aggregate of particular form, and for a particularly targeted noble metal loading) and once determined, repeated productions of this same catalyst can be commercially made to yield for each catalyst batch made a catalyst of optimum performance. Wherein, for one reason or another, some characteristic of the zeolite to be used for catalyst production and/or the quantity of noble metal loading therefore changes then for this next generation of catalyst having these new particulars, a new routine laboratory screening should be performed to determine that molar ratio of non-noble metal salt to base for formulating its loading solution that then will yield for this next generation catalyst an end point loading solution pH with ±0.1 pH units of a final pH in the range of 10.0 to 11.5 at which this next generation catalyst optimally performs in terms of yield and/or selectivity for the intended reforming reaction.

The above need for a precommercial production routine laboratory screen of a given zeolite aggregate to be used for production of the reforming catalyst stems from the fact that the differing manners/particulars under which the zeolite is formed into aggregates produces in the so formed zeolite aggregate different amounts of detrital alumina and/or silica. Accordingly, the precise conditions for exposure to the noble metal loading solution under which this detrital material will be most effectively removed from the zeolite aggregate and/or new detrital material is prevented from occurring as an aspect of noble metal loading—all as indicated by the end point pH after loading of the supernate loading solution— itself varies within the pH end point range of 10.0 to 11.5 as a function of the precise particulars of the zeolite aggregate itself. The end point pH of the supernate loading solution after completion of the noble metal loading into the zeolite aggregate reflects both the results of exchanging noble metal (i.e., Pt) into the zeolite aggregate and also of the dissolving or removing of detrital material (i.e., alumina binder detrital material) from the pores of the zeolite aggregate. A superior final catalyst results when this end point pH is in the range of 10.0 to 11.5 and within this end point range the version of the catalyst of most optimum performance will be formed at a particular end point pH value within a ±0.1 pH unit range that is determinable by laboratory prescreening as a function of the total non-noble metal cation content supplied to the initial loading solution and the molar ratio of non-noble metal salt to base by which this non-noble cation content is supplied to the initial loading solution.

Total immersion can be accomplished by pumping a batch of loading solution from a holding tank into and through a packed bed of catalyst and then back to the holding tank. The loading solution is recirculated through the bed of catalyst until most of the noble metal is ion exchanged into the zeolite. The linear velocity of loading solution through the catalyst bed should be high enough to induce good contacting and flow distribution of loading solution through the catalyst bed.

Another way to accomplish metal loading using the total immersion method is to mix the catalyst and loading solution in a tank using an agitator. Agitation should be sufficiently vigorous to attain good contact between the catalyst and the loading solution. The catalyst is separated from the loading solution by settling and decanting after loading is complete.

Contact time of one to two hours is adequate to achieve substantially complete, i.e., greater than 90% ion exchange of noble metals, in the loading solution into the catalyst. The process can be carried out at ambient temperature.

Distributing the batch of loading solution uniformly into the catalyst batch while the catalyst is tumbled is all that is required with the incipient wetness technique.

The noble metal can be loaded into the zeolite before the zeolite is formed into aggregates or into the formed zeolite aggregates. Loading metals into the formed aggregates is preferable because losses of zeolite powder containing valuable noble metals are reduced. Also, the metal loading procedure of this invention removes detrital matter deposited in the pores of the zeolite during aggregate forming and so improves the performance of the catalyst.

The loading solution is pumped from a storage tank through a vessel containing the charge of catalyst and then back to the loading solution storage tank. Recirculation is continued until at least 90% of the noble metal ion exchanges into the zeolite. Substantially complete ion exchange is achieved in about 30 minutes to 2 hours. Temperature is ambient. Another method for metal loading using the total immersion ion exchange method is to dip a perforated or mesh basket containing the zeolite aggregates into a vat of loading solution. The process can be accelerated by circulating the loading solution through the catalyst using an agitator immersed in the tank.

After the catalyst is separated from the loading solution while still wet it is aged for about 24 hours at a temperature between 100° (38° C.) and 180° F. (82° C.), to allow the platinum to uniformly distribute throughout the catalyst via diffusion. The wet catalyst is loaded into shallow covered pans and the pans are inserted in a temperature controlled oven where it is dried at temperatures between about 221° F. (105°) and 300° F. (149° C.). Typically it takes between five and eight hours to dry the catalyst. Finally, the catalyst is calcined at temperatures between 500° F. (260° C.) and 935° F. (502° C.).

The finished catalyst is loaded into process reactors to form a fixed bed. The catalyst contains ambient water absorbed during shipping and handling. At this point the platinum is in its cationic form ionically bonded to the zeolite L. The catalyst is activated by drying it and reducing the platinum to its zero valent metallic form with hydrogen using procedures previously specified. Ambient moisture is evolved by heating the catalyst to a temperature between 480° F. (249° C.) and 920° F. (493° C.) while passing nitrogen through the catalyst bed. The catalyst temperature is raised over a period of 24 hours at a uniform rate to avoid rapid release of water vapor. Next the platinum cations in the zeolite are reduced to their metallic state by adding hydrogen to the inert gas flowing through the bed at a temperature between 480° F. (249° C.) and 920° F. (493° C.). As the noble metal cations are reduced the non-noble metal cations in the catalyst replace the noble metal cations at the ion exchange sites in the zeolite thus precluding incorporation of hydrogen ions into the catalyst.

Reforming is initiated by feeding naphtha to the reactor along with hydrogen at reforming conditions. The feed is typically a $C_6$ to $C_{10}$ naphtha cut. Temperatures are preferably maintained between about 800° F. (427° C.) and 1000° F. (538° C.), pressure between 50 psig and 300 psig (0.345 and 2.068 MPa), weight hourly space velocity between 0.5 to 3.0 and hydrogen to hydrocarbon molar ratio between about 1 to 10. These are typical reforming reaction conditions.

The catalyst deactivates losing reforming activity slowly and steadily over time due to coking and noble metal agglomeration. Inlet feed temperatures are raised to compensate for diminishing activity but eventually inlet temperature exceeds the limits of the reactor materials which is typically 1000° F. (538° C.). So the process is interrupted and the catalyst is regenerated. Run lengths between regenerations vary depending on the severity of the reforming operating conditions and the feed composition but generally run between about 1000 hours and 20,000 hours. Reforming catalysts are regenerated using a process which includes burning off accumulated coke with air, and redispersing the noble metals by exposing the catalyst to a mixture of oxygen and a chlorine bearing gas such as hydrogen chloride. Excess chlorine adsorbed by the catalyst during regeneration must be stripped off the catalyst before it is reduced because residual chlorine interferes with the redispersion of the noble metal. Chlorine stripping is accomplished by passing hot inert gas such as nitrogen containing water and oxygen through the reactor. The lower the pressure the better the stripping; atmospheric pressure is preferred. Finally, the catalyst is reduced with hydrogen.

The following describes loading platinum into an alumina bound zeolite L extrudate using the total immersion ion exchange process and illustrates the general concepts underlying this invention. For purposes of the description of this embodiment of the present invention, the original zeolite cation is potassium and the non-noble metal cations added to the loading solution are also potassium so all the residual non-noble metal cations left in the catalyst are potassium. The catalyst so produced is a preferred reforming catalyst for aromatizing light paraffins to aromatics. Platinum tetraamine dichloride is the platinum source. (Platinum tetraamine dinitrate is also suitable). The platinum is contained in a cation so that it can ion exchange into the zeolite L.

Since the platinum cation is divalent and potassium cation is monovalent, each mole of the platinum cation ion exchanging into the zeolite releases 2 potassium cations. Additional potassium is added to the loading solution to make up the required potassium concentration. Some of the additional potassium is added as the base, potassium hydroxide; some is added as a salt source, potassium chloride and potassium nitrate. The ratio of potassium hydroxide to potassium chloride is controlled to achieve the target 10.0 to 11.5 loading solution endpoint pH. The total number of moles of potassium hydroxide and potassium chloride is between 1 and 10 times the number of moles of platinum added to the loading solution.

For purposes of the following formula, the amount of zeolite extrudate catalyst is A grams and the amount of platinum loaded into the catalyst is W % as metallic platinum on catalyst. The gram equivalents of potassium cations released by ion exchange is m.

With platinum cations assuming all the platinum ion exchanges into the zeolite, m is:

$$m = 2\left(\frac{\left(\frac{WA}{100}\right)}{M}\right)$$

where M is the molecular weight of the platinum salt. The factor of 2 is included because the platinum cation is divalent.

In accordance with the present invention, the equivalents of free potassium cations left in the catalyst must be P times m where P is a number between 1.0 and 6. To compute the concentration range of potassium in the loading solution, the grams of loading solution retained by the catalyst per gram of catalyst, G must first be determined. This can be done using a small sample of the catalyst by adding loading solution or water until the first sign of free liquid appears on the catalyst. This is the point of incipient wetness. G is typically between 0.2 and 0.7 grams of aqueous liquid per gram of catalysts at incipient wetness. With total immersion, S the grams of loading solution per gram of zeolite extrudate catalyst actually used is of course more than G. Typically S is 1.5 to 2.0 grams of loading solution per gram of catalyst.

The equivalents of potassium that must be in the loading solution to achieve the required P ratio factor is R where:

$$R = \left(\frac{S}{G}\right)Pm$$

R includes the m equivalents of potassium ions released when the platinum ion exchanged into the zeolite. Therefore, the moles of potassium that must be added to the loading solution from exterior sources is N:

$$N = m\left(\frac{S}{G}\right)(P-m); \text{ or}$$

$$N = m\left(\frac{(SP)}{G} - 1\right).$$

Some of the N equivalents of potassium required to make up the R requirement is added to the loading solution as potassium hydroxide and some as potassium chloride. The ratio of the hydroxide to salt is determined by experiment so that the endpoint pH of the loading solution is in the range of 10.0 to 11.5 in accordance with this invention.

The present invention is discussed herein in terms of one particular catalyst, i.e., platinum on potassium zeolite L formed into an extrudate bound with alumina, which is most preferred for purposes of the present invention. However, this description is not meant, and should not be construed, to limit the invention to the specifically described materials, means, parameters, and embodiments.

The present invention relates to other large/medium pore zeolites, such as zeolite X, Y, and ZSM-5 and is useful for ion exchanging catalytic metals into any non-acidic zeolite based catalyst.

The present invention relates to zeolite L with exchangeable cations other than potassium, such as exchangeable cations selected from the group consisting of divalent calcium cations, strontium cations, magnesium cations and barium cations, and monovalent lithium, sodium, cesium, and rubidium cations, other forms and binders, and other catalyst metals, and other zeolites.

For purposes of the present invention, the catalyst is a formed catalyst, which more preferably has a shape selected from the group of aggregates consisting of tablets, pellets, spheres, and extrudates.

For purposes of the present invention, the catalyst includes a binder material, which is preferably selected from the group consisting of kaolin, alumina, and silica and mixtures thereof to promote binding into aggregates.

Group VIII noble metals include platinum, palladium, rhodium, iridium, ruthenium and osmium. A Group VII B metal, such as rhenium may also be present so long as at lease one Group VIII noble metal is present. Rhenium is added in addition to Group VIII metal(s) to promote and complement the activity of the Group VIII metal(s). Platinum is the preferred catalyst metal for reforming catalysts. These catalytic metals may be present in any combination desired.

The zeolites suitable for purposes of the present invention preferably comprise exchangeable cations at least a portion of which are selected from the group of cations consisting of potassium, rubidium, cesium, magnesium, calcium, barium, and strontium. More preferably, the group of exchangeable cations consists of potassium and barium, and most preferably are potassium cations.

The preferred zeolite for purposes of the present invention is zeolite L which is a large pore zeolite. As used herein, the term "large pore zeolite is meant to include zeolites having pore diameter of greater than 6 angstroms. The large pore zeolites used for purposes of the present invention include type X, Y, and L. Medium pore zeolites with pore diameter from about 5 to 6 angstroms, e.g., ZSM-5, are also suitable. A description of zeolite L is provided in U.S. Pat. No. 3,216,789. A form of zeolite L preferred for reforming catalysts is described in U.S. Pat. No. 5,491,119.

An example of potassium zeolite L for reforming catalysts is produced by the process described in U.S. Pat. Nos. 4,552,856 and 4,544,539 the disclosures of which in their entireties are hereby incorporated by reference. Such zeolites are preferably formed into extrudates using an alumina binder preferably as described in U.S. Pat. No. 5,348,924.

The production of the catalyst by the loading process of the invention provides substantially better catalyst performance both in fresh and redispersed forms. The following are given by way of non-limited examples to further explain the present invention.

EXAMPLE 1

An amount of zeolite L extrudate (A=800 grams) bound with 28, wt % alumina binder made in accordance with the procedures disclosed in U.S. Pat. No. 5,348,924 was loaded to W=0.64 wt % platinum concentration by the procedure of this invention.

A platinum loading solution, at the initial pH 12.5, was prepared by dissolving 9.7055 grams of platinum tetraamin dichloride, monohydrate (Pt assay: 55.53 wt %, 0.02756 moles), 4.3211 grams of potassium hydroxide pellet (86% pure, 0.06623 moles) and 7.2717 grams of potassium chloride (0.09754) moles in enough water to make up the total weight of the solution to 1440 grams.

The above loading solution was placed in a tank and circulated at a rate of 600 ml/minute. Into this circulating solution, there was added 800 grams of zeolite L extrudate. After 1.5 hours, the platinum loading solution was drained to give 1048 grams of mother liquor. The pH of the motion mother liquor was measured to be 10.6. The wet extrudate was sealed in a plastic bag and placed in an oven at 122° F. (50° C.). After 20 hours, the wet extrudate was dried between 212° (100° C.) and 482° F. (250° C.) in an air circulated oven for 4 hours. The dry extrudate which was platinum loaded was calcined in rotary kiln between 392° (200° C.) and 662° F. (350° C.) for 3 hours. The platinum content of the resultant catalyst was determined to be 0.64 wt % by Platinum Assay Analysis.

EXAMPLE 2

The catalysts in the table below were made using the procedure in Example 1.

The only factor varied among catalysts A through E was the endpoint pH of the loading solution. All five catalysts were tested under the same reforming condition. Accordingly, this example shows how the endpoint pH of the loading solution affects performance of the catalyst at reforming conditions.

A total immersion process was used to platinum load the catalysts in which the extrudates were put in a mesh basket which was immersed in a tank. The loading solution was stored at ambient room temperature in a vessel and was pumped through th mesh basket containing the catalyst and back to the loading solution storage vessel. Circulation was maintained for 90 minutes. Good contacting between the loading solution and the catalyst was maintained.

The endpoint pH was varied between 10.5 and 11.2 by varying the ratio of KOH (base) to KCl (salt) added to the loading solution to provide the required concentration of potassium in the loading solution. As expected, endpoint pH increased with increasing KOH to KCl ratio.

This Example shows how the ratio of KOH (base) to KCl (neutral salt) of the extraneous non-catalytic cation sources can be used to control endpoint pH and how endpont pH affects catalyst performance. The catalyst performance was determined by running the catalysts at reforming conditions for 46 hours and then determining their benzene yield and selectivity. Test conditions were:

510° C.; 8 whsv; 107 psig (0.738 MPa); 4.25 molar hydrogen to feed ratio; and feed made up of 40% normal hexane and 60% 3 methylpentane.

This Example illustrates how loading solution pH is controlled by varying the KOH to KCl ratio.

TABLE 1

Effect of Loading Solution pH on Catalyst Activity

| Cat | KOH/HCl | pH INIT. | pH END | % YLD | SEL |
|-----|---------|----------|--------|-------|------|
| A   | 1.52    | 12.8     | 11.1   | 29.7  | 74.4 |
| B   | 1.00    | 12.7     | 11.2   | 31.4  | 75.7 |
| C   | 0.83    | 12.7     | 11.1   | 32.9  | 73.9 |
| D   | 0.66    | 12.6     | 10.9   | 34.4  | 77.7 |
| E   | 0.44    | 12.5     | 10.5   | 34.0  | 76.2 |

The data in Table 1 shows that the endpoint pH range of 10.5 to 11.2 covered in the example, catalyst performance is satisfactory.

What is claimed is:

1. An ion exchange method for dispersing noble metals into catalyst support aggregates comprising a binder and a zeolite containing original non-noble metal exchangeable cations, by contacting said catalyst support aggregates with an aqueous loading solution comprising catalytic noble metals present in cationic form and a source of non-noble metal cations, under conditions effective for said noble metal cations to ion exchange into said zeolite thereby displacing said original non-noble metal cations from said zeolite into the aqueous loading solution, and for a time sufficient so that the ion exchange of said noble metals into the said zeolite is substantially complete, wherein the improvement comprises (a) formulating said aqueous loading solution to contain a quantity of non-noble metal cations such that after ion exchange of said noble metals into the zeolite is substantially complete the gram equivalents of said non-noble metal cations remaining in the catalyst support which are not ionically bound into said zeolite is between about 2 and about 6 times the gram equivalents of said original non-noble metal cations displaced by said noble metal cations, and (b) maintaining the endpoint pH of said loading solution when the ion exchange is complete at between about 10.0 and about 11.5.

2. The method recited in claim 1 wherein substantially all of said aqueous loading solution is absorbed into the said catalyst support aggregates upon completion of said ion exchange.

3. The method recited in claim 1 wherein said loading solution remains in contact with the said catalyst support aggregates upon completion of said ion exchange.

4. The method recited in claim 1 wherein said non-noble metal cations in the loading solution are the same cations as the original cations in said zeolite.

5. The method recited in claim 1 wherein said non-noble metal exchangeable cations comprise at least one zeolite cation selected from the group consisting of barium cations, magnesium cations, calcium cations, strontium cations, potassium cations, lithium cations, sodium cations, cesium cations, rubidium cations, and mixtures thereof.

6. The method recited in claim 1 wherein said original non-noble metal exchangeable cations comprise potassium cations.

7. The method recited in claim 6 wherein said non-noble metal cations in said loading solution comprise potassium.

8. The method recited in claim 1 wherein said source of noncatalytic metal exchangeable cations in said aqueous solution comprises a base of said non-noble metal exchangeable cation and a neutral salt of said non-noble metal exchangeable cation in a predetermined ratio.

9. The method recited in claim 8 wherein said predetermined ratio of said base to said salt is such as to provide a loading solution endpoint pH in the range of 10.0 to 11.5.

10. The method recited in claim 1 wherein said zeolite comprises a large pore zeolite.

11. The method recited in claim 10 wherein said large pore zeolite comprises a member selected from the group consisting of zeolite X, zeolite Y, and zeolite L.

12. The method recited in claim 11 wherein said large pore zeolite comprises zeolite L.

13. The method recited in claim 1 wherein said zeolite comprises a medium pore zeolite.

14. The method recited in claim 13 wherein said medium pore zeolite is ZSM-5.

15. The method recited in claim 1 wherein said noble metal comprises a Group VIII noble metal.

16. The method recited in claim 15 wherein said Group VIII noble metal comprises at least one metal selected from the group consisting of platinum, iridium, palladium, rhodium, ruthenium and osmium.

17. The method recited in claim 16 wherein said support further comprises rhenium.

18. The method recited in claim 1 wherein said aggregate has a form selected from the group consisting of tablets, pellets, spheres, and extrudates.

19. The method recited in claim 18 wherein said aggregate comprises a binder material comprising at least one member selected from the group consisting of alumina, kaolin, alumina, silica, and mixture thereof.

20. The method recited in claim 19 wherein said binder material comprises alumina.

21. The method recited in claim 1 wherein, m, the gram equivalents of said non-catalytic cations released by said zeolite when said noble metal cations ion exchange into said zeolite is determined from the following formula in which n is the valence of the noble metal cation or noble metal cation complex, W is the weight percent noble metal on said catalyst support, A is the weight of said catalyst support, $$m = \left(\frac{\left(\frac{WA}{100}\right)}{M}\right) n$$

and M is the molecular weight of the noble metal source and all weights are expressed in grams:

and where the number of gram equivalents of non-noble metal cations not ionically bonded to said zeolite remaining in the catalyst is P times m and P is between 1.0 and 6, and wherein the endpoint pH of the said loading solution is between 10.0 and 11.5, and the total gram equivalents of non-noble metal cations which must be added to the said loading solution, as salt and base, N is determined using the formula:

$$N = m\left(\frac{(SP)}{G} - 1\right)$$

where S is the grams of noble metal loading solution used per gram of said catalyst substrate aggregate and G is the grams of said loading solution absorbed by said catalyst support aggregate.

22. In an ion exchange method for loading platinum into a catalyst support aggregate comprising zeolite L in which original non-noble metal cations in the said zeolite L are potassium, said method comprising immersing said catalyst support in a sufficient amount of aqueous loading solution comprising platinum in cationic form and potassium, such that there is free loading solution after the catalyst substrate is saturate with loading solution wherein the improvement comprises formulating the loading solution to contain a quantity potassium cations from KOH and potassium salt such that after the catalyst substrate is separated from said loading solution 2 to 3 times the equivalents of said original potassium cations displaced from the zeolite when the said platinum cations exchanged into the said zeolite L remain in the catalyst support, and the ratio of KOH to potassium salt added to the said loading solution is such that the endpoint pH of said loading solution is between 10.0 and 11.5.

23. The method recited in claim 22 in which said loading solution endpoint pH between 10.0 and 11.5 is further constrained to a 0.2 pH range within the said 10.0 to 11.5 pH range to impart desired catalyst activity, activity maintenance and selectivity to the said catalyst support aggregate.

24. In an impregnation ion exchange method for loading platinum into a catalyst support aggregate comprising zeolite L in which the original non-noble metal cations in said zeolite L are potassium, said method comprising impregnating said catalyst support with an aqueous loading solution comprising platinum in cationic form and potassium, the improvement comprising formulating said loading solution to contain a quantity of potassium cations from KOH potassium salt such that 2 to 6 times the equivalents of said original potassium cations displaced from the zeolite when the said platinum cations exchange into the said zeolite L are added to the catalyst support, and the ratio of KOH to potassium salt added to said loading solution is such that when one part by weight of catalyst is mixed with 10 parts by weight of water, the resulting supernatant water has a pH between 10.0 and 11.5.

25. The method recited in claim 24 wherein at least a portion of said non-catalytic cations in the said loading solution are added to the said loading solution as KOH and at least a portion of said non-catalytic cations are added to the said loading solution as a potassium salt and the ratio of KOH to potassium salt added to the said loading solution is adjusted to achieve an initial loading solution pH which has been predetermined to provide an endpoint loading solution pH in the said 10.0 to 11.5 range.

26. An ion exchange method for dispersing noble metals into catalyst support aggregates comprising a binder and a zeolite containing original non-noble metal exchangeable cations, by contacting said catalyst support aggregates with an aqueous loading solution comprising catalytic noble metals present in cationic form and a source of non-noble metal cations, under conditions effective for said noble metal cations to ion exchange into said zeolite thereby displacing said original non-noble metal cations from said zeolite into the aqueous loading solution, and for a time sufficient so that the ion exchange of said noble metals into the said zeolite is substantially complete, wherein the improvement comprises:

formulating said aqueous loading solution to contain a quantity of non-noble metal cations such that after ion exchange of said noble metals into the zeolite is substantially complete the gram equivalents of said non-noble metal cations remaining in the catalyst support which are not ionically bound into said zeolite is between about 2 and about 6 times the gram equivalents of said original non-noble metal cations displaced by said noble metal cations, and providing said quantity of non-noble metal cations from a mixture of a non-noble metal hydroxide and a non-noble metal salt in a molar ratio of the hydroxide to the salt that when the ion exchange is complete said loading solution has a pH between about 10.0 and about 11.5.

27. In a method for forming a catalyst which involves ion exchange loading of platinum into a catalyst support comprising a zeolite L containing potassium as its original non-noble metal cations, wherein platinum cations exchange into the said zeolite L to cause equivalents of potassium cations to be displaced from the zeolite L, said method comprising immersing said catalyst support in a sufficient amount of an aqueous loading solution containing platinum in cationic form and potassium such that there is free loading solution after the catalyst support is saturated with loading solution, an improvement comprising; formulating the loading solution to contain a quantity of potassium from a potassium salt and potassium cations from KOH such that after ion exchange of platinum into the zeolite is substantially complete and the catalyst support is separated from said loading solution from 2 to 3 times of the equivalents of said original potassium cations displaced from the zeolite L when the said platinum cations exchange into the zeolite L remain in the catalyst support which are not ionically bound into said zeolite, and the KOH and potassium salt are added to said loading solution in a ratio of KOH to potassium salt such that when the catalyst support is separated said loading solution has an endpoint pH of between 10.0 and 11.5 which is constrained to a 0.2 pH range that imparts a desired catalyst activity, activity maintenance and selectivity to a catalyst formed from the catalyst support.

28. An ion exchange method for dispersing noble metals into catalyst support aggregates comprising a binder and a zeolite containing original non-noble metal exchangeable cations, by contacting said catalyst support aggregates with an aqueous loading solution comprising catalytic noble metals present in cationic form and a source of non-noble metal cations, under conditions effective for said noble metal cations to ion exchange into said zeolite thereby displacing said original non-noble metal cations from said zeolite into the aqueous loading solution, and for a time sufficient so that the ion exchange of said noble metals into the said zeolite is substantially complete, wherein the improvement comprises:

formulating said aqueous loading solution to contain a quantity of non-noble metal cations such that after ion exchange of said noble metals into the zeolite is substantially complete the gram equivalents of said non-noble metal cations remaining in the catalyst support which are not ionically bound into said zeolite is between about 2 and about 4 times the gram equivalents of said original non-noble metal cations displaced by said noble metal cations, and providing said quantity of non-noble metal cations from a mixture of a non-noble metal hydroxide and a non-noble metal salt in a molar ratio of the hydroxide to the salt that when the ion exchange is complete said loading solution has a pH between about 10.0 and about 11.5.

* * * * *